United States Patent
Xu et al.

(10) Patent No.: US 12,119,215 B1
(45) Date of Patent: Oct. 15, 2024

(54) ELECTROSTATIC ION TRAP

(71) Applicant: NINGBO UNIVERSITY, Zhejiang (CN)

(72) Inventors: Fu-Xing Xu, Zhejiang (CN); Li Ding, Zhejiang (CN)

(73) Assignee: NINGBO UNIVERSITY, Zhejinag (CN)

(*) Notice: Subject to any disclaimer, the term of this patent is extended or adjusted under 35 U.S.C. 154(b) by 0 days.

(21) Appl. No.: 18/035,331

(22) PCT Filed: May 18, 2022

(86) PCT No.: PCT/CN2022/093463
§ 371 (c)(1),
(2) Date: May 4, 2023

(87) PCT Pub. No.: WO2023/097985
PCT Pub. Date: Jun. 8, 2023

(30) Foreign Application Priority Data

Nov. 30, 2021 (CN) .......................... 202111440866.0

(51) Int. Cl.
*H01J 49/42* (2006.01)
(52) U.S. Cl.
CPC ................................ *H01J 49/4245* (2013.01)
(58) Field of Classification Search
CPC .................................................. H01J 49/4245
USPC ....................................................... 250/281
See application file for complete search history.

(56) References Cited

U.S. PATENT DOCUMENTS

2016/0148795 A1* 5/2016 Köster ................ H01J 49/425
250/287

FOREIGN PATENT DOCUMENTS

| CN | 1799119 A | 7/2006 |
|---|---|---|
| CN | 101273432 A | 9/2008 |
| CN | 111986981 A | 11/2020 |
| CN | 112185798 A | 1/2021 |
| CN | 114388339 A | 4/2022 |

OTHER PUBLICATIONS

Chinese Intellectual Property Office (ISR/CN), "International Search Report for PCT/CN2022/093463", China, Jul. 29, 2022.

* cited by examiner

*Primary Examiner* — Kiet T Nguyen
(74) *Attorney, Agent, or Firm* — Locke Lord LLP; Tim Tingkang Xia, Esq.

(57) ABSTRACT

The invention relates to an electrostatic ion trap having a central axis and a central symmetrical plane perpendicular to the central axis. The electrostatic ion trap comprises an inner electrode group arranged along the central axis and a pair of outer electrode groups arranged on two sides of the central symmetry plane along the central axis. Each outer electrode group comprises a plurality of electrode plates. The plurality of electrode plates are circumferentially distributed around a periphery of the inner electrode group and centered on the central axis. At least two electrode plates in the same outer electrode group are electrically connected. A potential difference is formed when voltages are respectively applied to the inner electrode group and the outer electrode groups, thereby forming a space for trapping ions between the inner electrode group and the outer electrode groups.

10 Claims, 9 Drawing Sheets

ELECTROSTATIC ION TRAP

TECHNICAL FIELD OF THE INVENTION

The invention relates to the technical field of ion traps, in particular to an electrostatic ion trap.

BACKGROUND OF THE INVENTION

An orbitrap is developed on the basis of a Kingdon ion trap, and comprises a spindle-shaped central electrode and a pair of outer electrodes that are coaxially arranged with the central electrode, where the central electrode is arranged between the outer electrodes, ions are injected into a space between the central electrode and the outer electrodes in a tangential direction through an inlet hole on the outer electrodes. By adjusting the potential of the central electrode so as to exert enough centripetal force to the ions, the ions can be bound on a moving orbit. The motion orbit of the ions includes a rotational motion around the central electrode and a reciprocating motion along the direction of the central axis. The reciprocating motion of the ions can form periodic image charges on the outer electrodes. The image charges formed on the outer electrodes are amplified by a charge amplifier to become charge signals to be output. Fourier transform of the charge signals forms a frequency spectrum. Due to frequency $$f = \sqrt{\frac{k}{(m/z)}},$$

the frequency spectrum can be converted into an ion mass spectrum in the trap. The high spectral resolution can be obtained using longer image charge signal acquisition (approximately equal to 1s). However, this requires the ion trap be in a very high vacuum to avoid the ions in motion from colliding with residual gas molecules. It also requires that the center electrode and the outer electrodes must have extremely high processing accuracy to ensure the voltages of the center electrode and the outer electrodes stable, so that the electric field distribution in the ion trap can be accurately and stably satisfied with the condition of highly time-focused, thereby keeping the cluster uniformity (coherent) of the ions in the axial direction after moving for a long time, preventing the ions from diverging, and ensuring the charge signal of the image charges last for the entire measurement time without fading away.

In order to achieve a resolution of hundreds of thousands, it is necessary to ensure that the ions do not diverge when they reciprocate hundreds of thousands of times in the trap, and the machining accuracy of the electrodes must reach the sub-micron level. For a special-shaped curved surface, it is very difficult to process even with the most advanced numerical control machine tools, and the yield is very low. Moreover, it is difficult to determine whether the outer electrode of an orbitrap is qualified after processing with a conventional three-coordinate measuring instrument or an optical measuring instrument. Usually, the processing quality is determined by testing the working performance of the ion trap after the inner electrode and the outer electrodes and supports at two ends are assembled into the ion trap. If the quality does not meet the requirements, it can only be disposed of as waste, thereby causing great waste. Moreover, the current overall electrode structure of the ion trap makes the ion trapping space relatively sealed, which is not conducive to internal pumping to achieve ultra-high vacuum.

SUMMARY OF THE INVENTION

The objectives of this invention is to solve the problems of how to facilitate the production and assembly of the ion traps with improvement of the yield of the ion traps under the accuracy requirements of the ion traps, and at the same time facilitate the internal pumping of the ion traps to achieve ultra-high vacuum.

In order to solve the above problems, the present invention provides an electrostatic ion trap. The electrostatic ion trap has a central axis and a central symmetry plane perpendicular to the central axis. The electrostatic ion trap includes an inner electrode group and a pair of outer electrode groups disposed on two opposite sides of the central symmetry plane along the central axis. Each outer electrode group includes a plurality of electrode plates. The plurality of electrode plates are circumferentially arranged around the periphery of the inner electrode group and centered on the central axis. At least two electrode plates in the same outer electrode group are electrically connected. A potential difference is formed between the inner electrode group and the outer electrode groups when voltages are applied respectively to the inner electrode group and the outer electrode groups, thereby forming a space for trapping ions between the inner electrode group and the outer electrode groups.

The invention has the following beneficial effects. The electrostatic ion trap according to the invention is formed by combining an inner electrode group and a pair of outer electrode groups including the electrode plates, and does not need to process the outer electrodes with a high-precision special-shaped rotating curved surface. This solves the problem that the outer electrodes are difficult to process in the prior art. By applying voltages on the inner electrode group and the outer electrode groups, an electric field for trapping ions is formed in the space between the inner electrode group and the outer electrode groups; and the ions vibrate back and forth in the direction of the central axis while rotating around the inner electrode in the trap. According to the invention, the geometry shapes of the electrode plates determine the electric field formed in the space, so that the kinetic energy of the ions satisfies the isochronous focusing in the period of axial vibrations. In addition, the transparent structure of the electrostatic ion trap also facilitates the realization of ultra-high vacuum in the trap.

In one embodiment, the inner electrode group includes a center electrode, and the center electrode is disposed along with the center axis.

In one embodiment, the inner electrode group includes two central electrodes, and the two central electrodes are arranged centrosymmetrically about the central axis.

In one embodiment, the pair of outer electrode groups are symmetrically disposed on opposite sides of the central symmetry plane.

In one embodiment, the electrode plates of each outer electrode group are evenly and circumferentially arranged on the periphery of the inner electrode group, the electrode plates of one of the pair of outer electrode groups and the electrode plates of another of the pair of outer electrode groups are staggered circumferentially, so as to guaranty the integrity of an electric field in the ion trap.

In one embodiment, two ends of the inner electrode group are fixedly connected with two insulating end covers through threaded fasteners respectively; an insulating central ring sleeve is arranged between the two insulating end covers at a position, corresponding to the central symmetrical plane, of the periphery of the inner electrode group; and the electrode plates of the outer electrode groups are clamped between the insulating end covers and the insulating central ring sleeve.

In one embodiment, each electrode plate has a clamping portion integrally formed at one end corresponding to the insulating central ring sleeve, and a positioning portion integrally and convexly formed at another end corresponding to the insulating end cover.

In one embodiment, each insulating end cover has an inner surface, a positioning step integrally formed on an inner surface, and a plurality of radially extending positioning grooves circumferentially formed on the inner surface and surrounding the positioning step.

In one embodiment, each electrode plate is abutted against and clamped with the insulating central ring sleeve through the clamping portion. Further, each electrode plate is clamped with a respective one of the insulating end covers through the positioning portion of said electrode plate received in the positioning groove of said insulating end covers such that an inner side of said electrode plate is abutted against the positioning step of said insulating end covers.

In one embodiment, the electrode plates in each outer electrode group are characterized into a first outer electrode unit group and a second outer electrode unit group. An adjustment potential difference is formed between the first outer electrode unit group and the second outer electrode unit group when voltages are respectively applied to the first outer electrode unit group and the second outer electrode unit group. The electrode plates of the first outer electrode unit group and the electrode plates of the second outer electrode unit group are distributed alternatively. By adjusting the adjustment potential difference between the first outer electrode unit group and the second outer electrode unit group, an axial high-order field shape distribution in the ion trap can be fine-tuned, so that errors generated in the manufacturing process of the ion trap can be corrected. It can also be used to overcome the influence of space charges on the electric field in the ion trap, realize real-time adjustment and correction, and further expand the analysis dynamic range of the ion trap.

In one embodiment, each electrode plate of the first outer electrode unit group has a first arc-shaped structure at a side corresponding to the inner electrode group, the first arc-shaped structure of each electrode plate of the first outer electrode unit group comprises a first arc-shaped segment and a second arc-shaped segment. Each electrode plate of the second outer electrode unit group has a second arc-shaped structure at a side corresponding to the inner electrode group, the second arc-shaped structure of the electrode plate of the second outer electrode unit group comprises a first arc-shaped segment and a third arc-shaped segment. The distance from the third arc-shaped segment to the central axis is smaller than the distance from the second arc-shaped segment to the central axis, which is used to assist in fine-tuning of the field shape distribution. Each insulating end cover is abutted against the inner side of the electrode plates through the positioning steps, thereby realizing the electrode plates assembled uniformly.

In one embodiment, each electrode plate in the outer electrode group on the incident path of ions into the space is provided with an entrance notch for facilitating the entrance of ions.

In one embodiment, each electrode plate is made of a hard metal plate with the thickness of 0.5 mm-2 mm by an electric spark cutting process.

Figure 1:
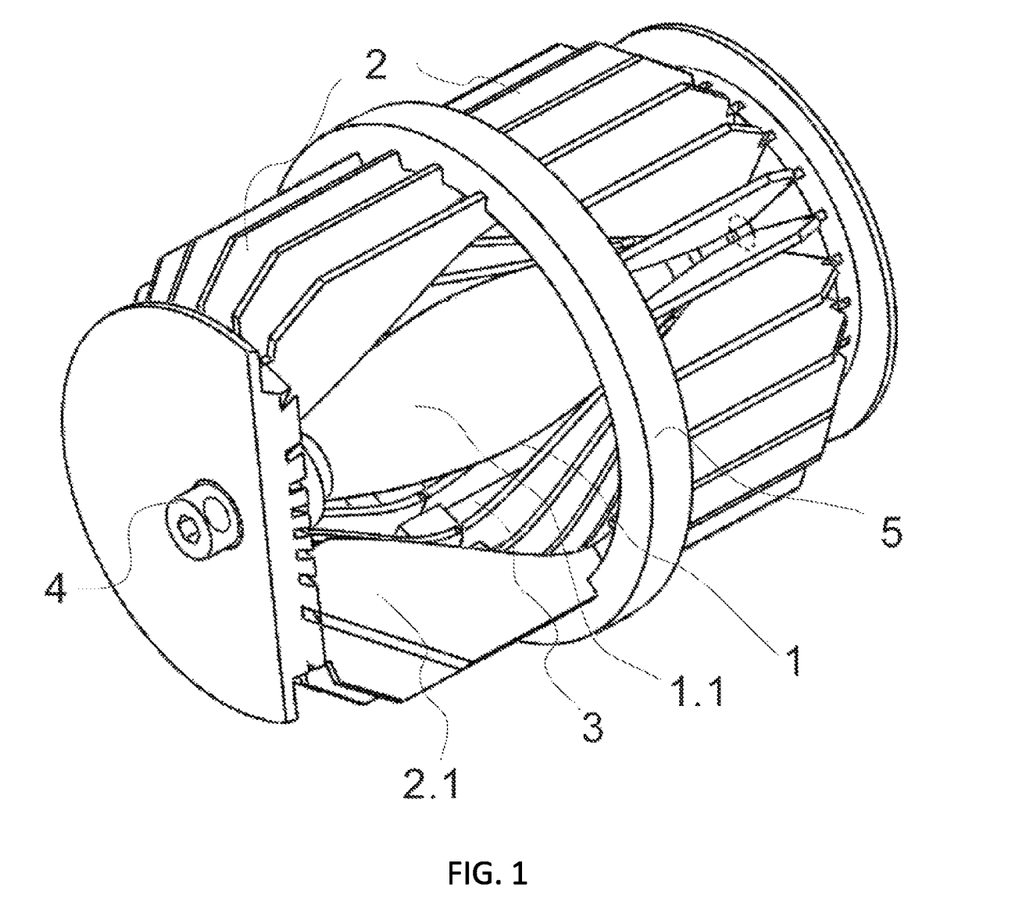
FIG. 1 is a schematic structural diagram of an electrostatic ion trap according to embodiment 1 of the present invention.

DESCRIPTION OF REFERENCE NUMERALS IN THE FIGURES 1, inner electrode group; 1.1, central electrode; 2, outer electrode group; 2.1, electrode plate; 2.1A, first outer electrode unit group; 2.1B, second outer electrode unit group; 2.1.1, first arc-shaped segment; 2.1.2, second arc-shaped segment; 2.1.3, clamping portion; 2.1.4, positioning portion; 2.1.5, third arc-shaped segment; 2.1.6, first compensation block; 2.1.7, third straight line segment; 2.1.8, first straight line segment; 2.1.9, second straight line segment; 3, space; 4, insulating end cover; 4.1, positioning step; 4.2, positioning groove; 5, insulating central ring sleeve e; 6, entrance notch.

DETAILED DESCRIPTION OF THE INVENTION

In order to make the aforementioned objectives, features and advantages of the present invention comprehensible, exemplary embodiments accompanied with figures are described in detail below.

EMBODIMENT 1

As shown in FIG. 1, an electrostatic ion trap has a central axis and a central symmetry plane perpendicular to the central axis. The central axis of this embodiment is the central axis of the electrostatic ion trap, and therefore, the central symmetry plane is also determined as the central axis is defined. The electrostatic ion trap includes an inner electrode group 1 and a pair of outer electrode groups 2 disposed on both sides of the central symmetry plane along the central axis. Specifically, the inner electrode group 1 in this embodiment includes a central electrode 1.1. The central electrode 1.1 is disposed around the central axis. Each outer electrode group 2 includes a plurality of electrode plates 2.1. The electrode plates 2.1 are circumferentially and evenly arranged on the periphery of the inner electrode group 1 around the central axis. One outer electrode group 2 and another outer electrode group 2 of the pair of outer electrode groups are symmetrically disposed on both sides of the central symmetry plane. In one embodiment, the electrode plates 2.1 of each outer electrode group 2 are electrically connected. When voltages are respectively applied to the inner electrode group 1 and the outer electrode groups 2, a potential difference is formed between the inner electrode group 1 and the outer electrode groups 2, a space 3 for trapping ions is formed between the inner electrode group 1 and the outer electrode groups 2, the ions rotate around the central electrode 1.1 under the constraint of the electric field formed in the space 3 and vibrate back and forth along the central axis direction. The shapes of the electrode plates 2.1 determines the electric field in the space 3, which makes the motion components of the ions along the central axis direction are approximately in simple harmonic motion. That is, the period of vibration in the direction of the central axis satisfies the isochronous focusing condition for the kinetic energy of the ions.

Figure 2:
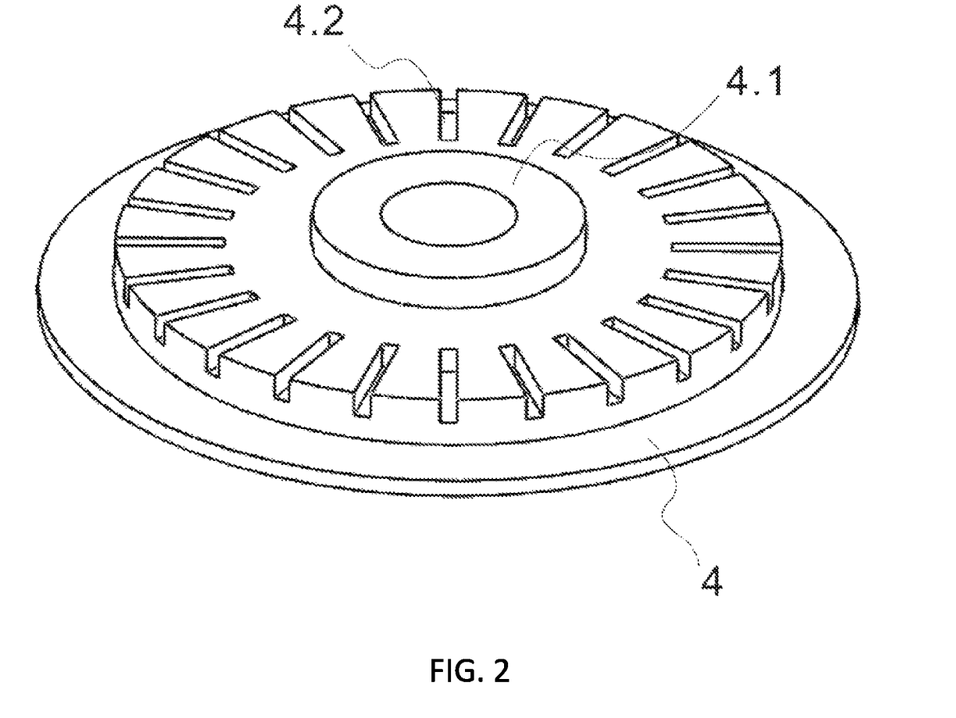
FIG. 2 is a schematic structural diagram of an insulating end cover in the electrostatic ion trap according to embodiment 1 of the present invention.
Figure 3:
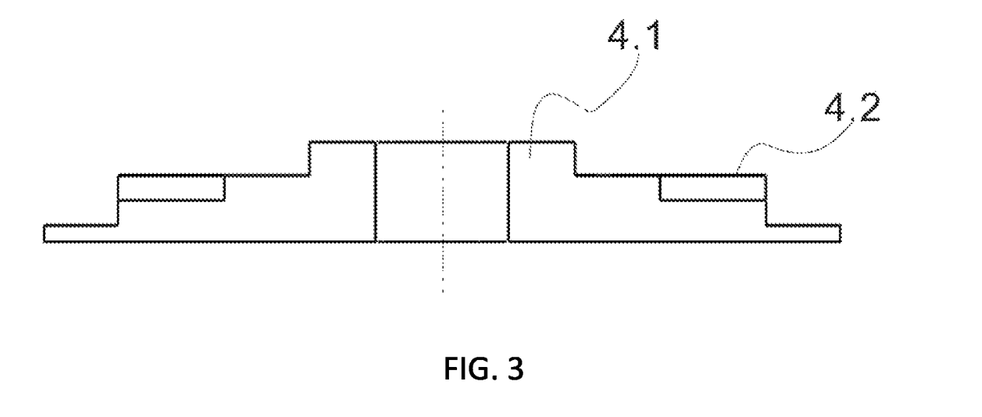
FIG. 3 is a schematic cross-sectional view of the insulated end cover in the electrostatic ion trap according to embodiment 1 of the present invention.
Figure 5:
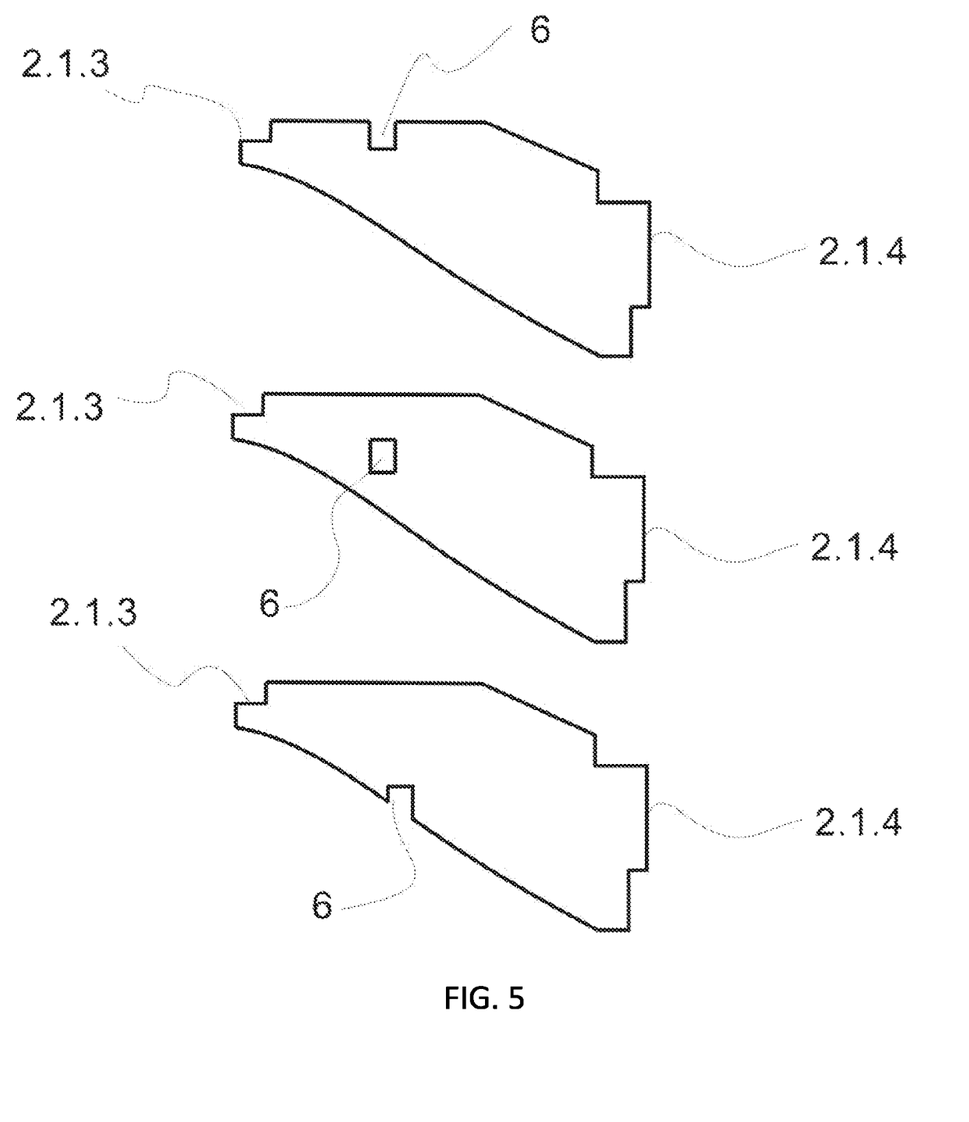
FIG. 5 is a schematic structural diagram of the electrode plates in the incident path in an electrostatic ion trap according to embodiment 1 of the present invention.

Two ends of the inner electrode group 1 are fixedly connected with two insulating end covers 4 through threaded fasteners, respectively. The threaded fasteners in one embodiment are bolts. An insulating central ring sleeve 5 is arranged between the two insulating end covers 4 at the position, corresponding to the central symmetrical plane, of the periphery of the inner electrode group 1. The electrode plates 2.1 of the outer electrode groups 2 are clamped between the insulating end covers 4 and the insulating central ring sleeve 5. Specifically, each electrode plate 2.1 has a clamping portion 2.1.3 integrally formed at one end corresponding to the insulating central ring sleeve 5, and a positioning portion 2.1.4 integrally and convexly formed at another end corresponding to the insulating end cover 4, as shown in FIG. 5. The positioning portion 2.1.4 is adapted for facilitating the assembly of the electrode plate 2.1 and the processing of a grinding wheel of a grinding machine. Each insulating end cover 4 has an inner surface, a positioning step 4.1 integrally formed on an inner surface, and a plurality of radially extending positioning grooves 4.2 circumferentially formed on the inner surface and surrounding the positioning step 4.1, and one end of the positioning grooves 4.2 corresponding to the positioning step 4.2 does not extend to the positioning step 4.2, as shown in FIG. 2-3. The positioning grooves 4.2 are in one-to-one correspondence with the electrode plates 2.1. Each electrode plate 2.1 is abutted against and clamped with the insulating central ring sleeve 5 through the clamping portion 2.1.3. Each electrode plate 2.1 is clamped with a respective one of the insulating end covers 4 through the positioning portion 2.1.4 of said electrode plate 2.1 received in the positioning groove 4.2 of said insulating end covers 4 such that an inner side of said electrode plate 2.1 is abutted against the positioning step 4.1 of said insulating end covers 4.

Figure 4:
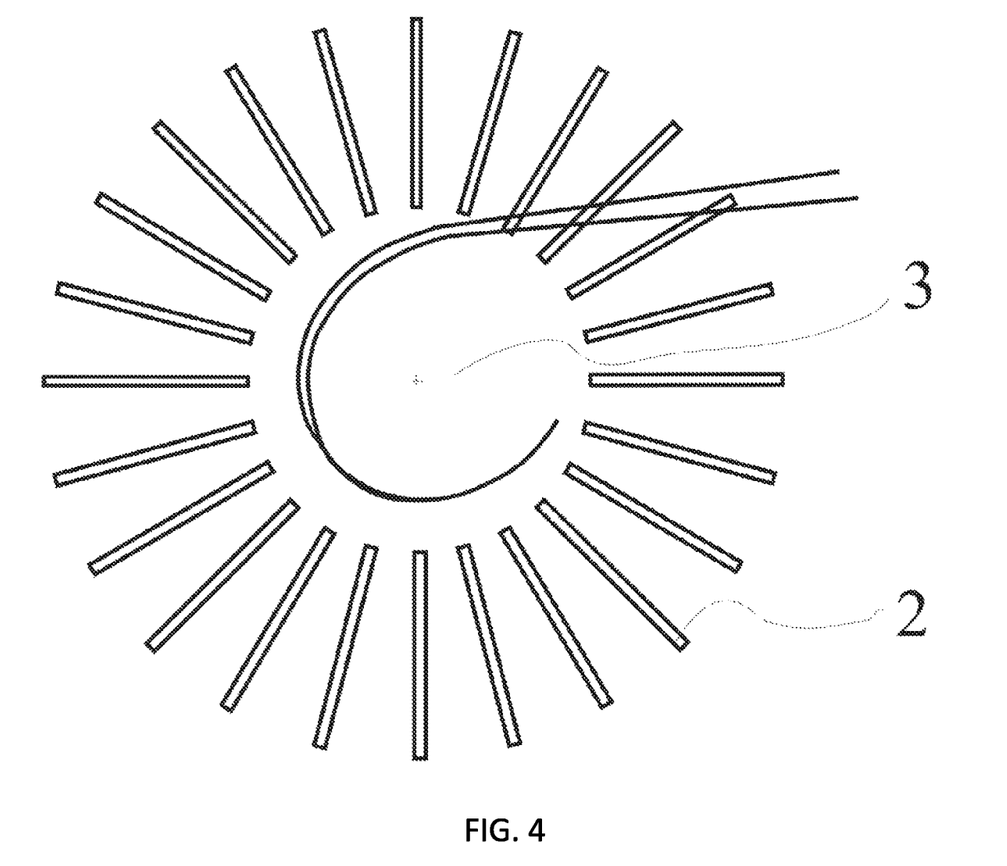
FIG. 4 shows schematically an incident path of ions into a space in the electrostatic ion trap according to embodiment 1 of the present invention.

Meanwhile, in order to facilitate the ion entry into the space 3 in the ion trap, an incident path of the ions entering the ion trap needs to be designed, as shown in FIG. 4, in the exemplary embodiment, the ions enter the space 3 along an off-axis eccentric direction. Accordingly, at least one electrode plate 2.1 in the outer electrode group 2 is located on the incident path of the ions, as shown in FIG. 4, and each of the at least one electrode plate 2.1 located on the incident path has an entrance notch 6 formed to facilitate the ions entry, as shown in FIG. 5. Depending upon where the electrode plate 2.1 is located on the incident path, the entrance notch 6 can be formed in an upper edge, middle portion or lower edge of the electrode plate 2.1, as shown respectively in top, middle and bottom panels of FIG. 5. The ions enter the space 3 from the entrance notch 6 along the incident path, as shown in FIG. 4.

The electrode plate 2.1 is made of a hard metal plate with the thickness of 0.5 mm-2 mm by adopting an electric spark cutting process or a photoetching process. In one embodiment, a plurality of hard metal plates is overlapped together in the electric spark cutting process, and are cut in batches according to the bus equation of the outer electrode, thereby lowering the cost. The hard metal plates in one embodiment are made of one of the following: 316 stainless steel, abrasive stainless steel inkonel, molybdenum.

EMBODIMENT 2

Although the electrode plates 2.1 are fabricated by the electric spark cutting based on the bus equation of the outer electrode, it cannot guarantee that each electrode plate 2.1 meets the accuracy of 1 μm. In addition, the electrostatic ion trap may also introduce further errors during the assembly process, such as material creep, stress release, and shape changes, so that the isochronism of ion movements cannot be guaranteed. Accordingly, the present embodiment differs from embodiment 1.

Figure 6:
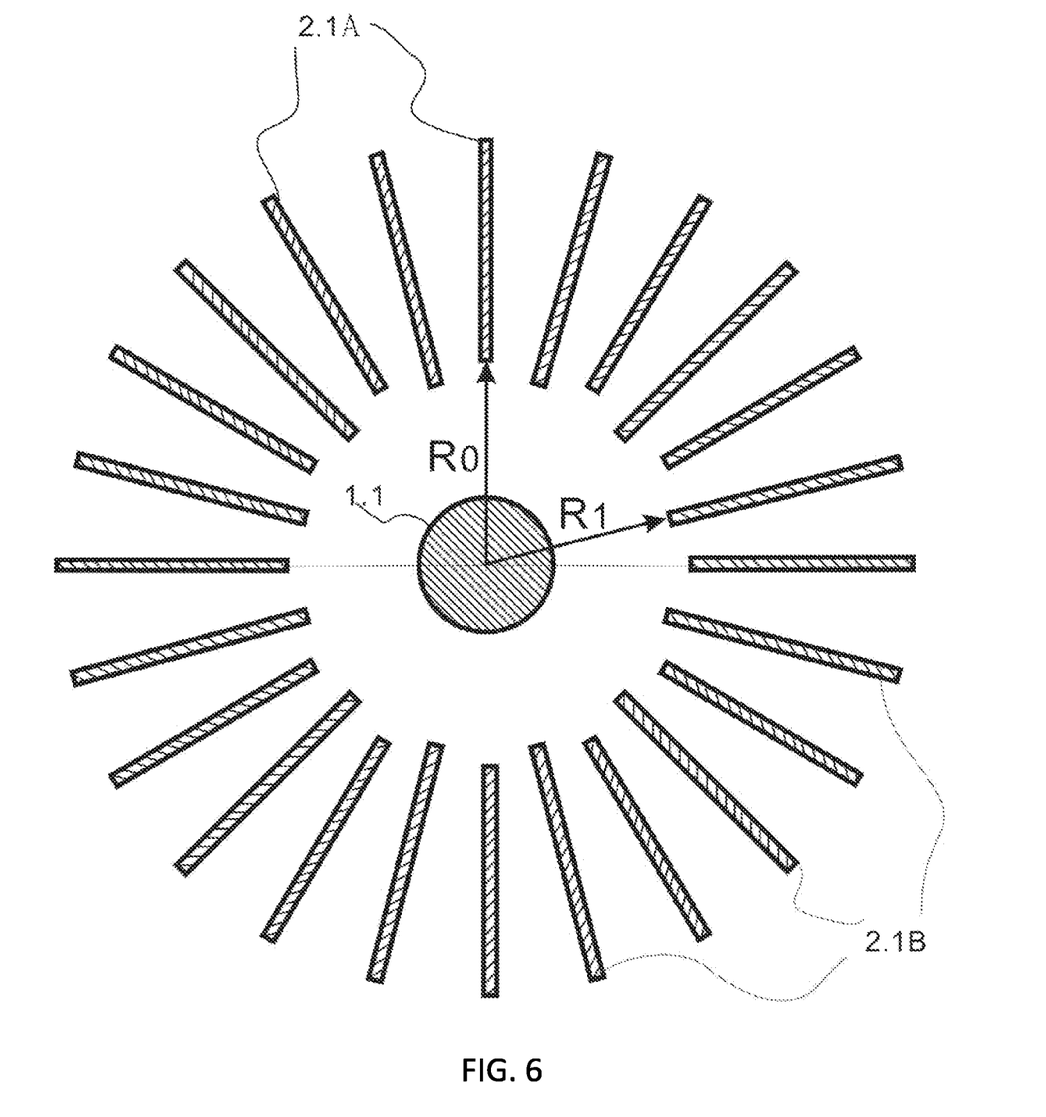
FIG. 6 shows schematically an electrode plate distribution of a first outer electrode unit group and a second outer electrode unit group in an electrostatic ion trap according to embodiment 2 of the present invention.

As shown in FIG. 6, the electrode plates 2.1 of each outer electrode group 2 is characterized into a first outer electrode unit group 2.1A and a second outer electrode unit group 2.1B. When voltages are respectively applied to the first outer electrode unit group 2.1A and the second outer electrode unit group 2.1B, an adjustment potential difference is formed between the first outer electrode unit group 2.1A and the second outer electrode unit group 2.1B. The electrode plates 2.1 of the first outer electrode unit group 2.1A and the electrode plates 2.1 of the second outer electrode unit group 2.1B are arranged alternately. By adjusting the potential difference between the first external electrode unit group 2.1A and the second external electrode unit group 2.1B to fine-tune the field shape distribution, the component of the axial high-order field is adjusted, so that the ions better meet the isochronous focusing condition, and the errors introduced during ion trap fabrication can be corrected.

Figure 7A:
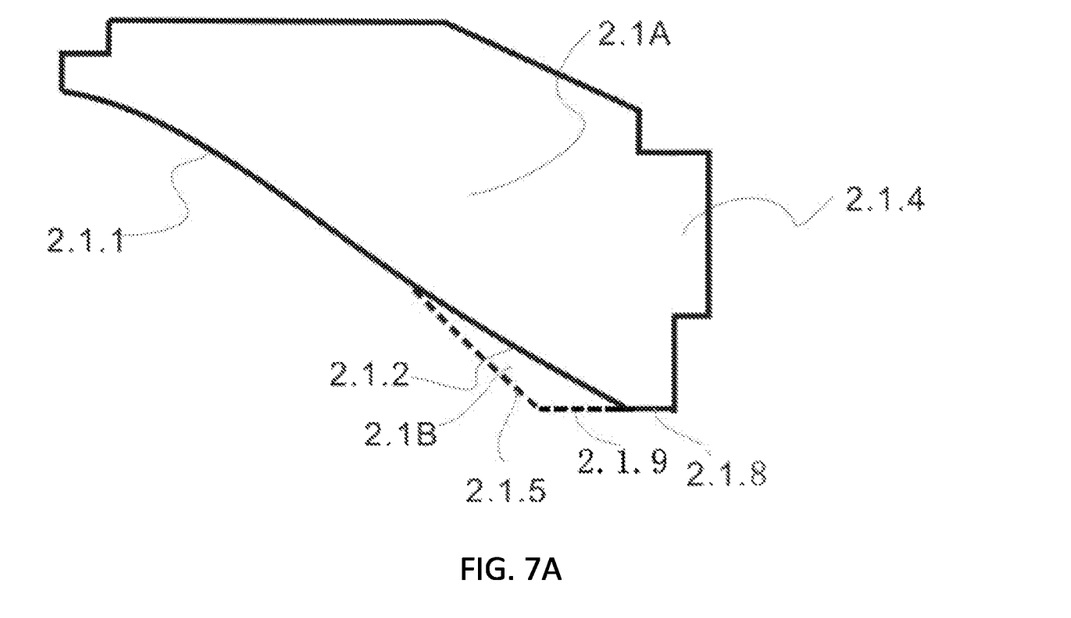
FIG. 7A is a schematic diagram illustrating a comparison between an electrode plate of a first outer electrode unit group and an electrode plate of a second outer electrode unit group in the electrostatic ion trap according to embodiment 2 of the present invention.

For the convenience of explanation, in this exemplary embodiment, the electrode plates of the first outer electrode unit group 2.1A and the second outer electrode unit group 2.1B are superimposed and compared to obtain FIG. 7A. Each electrode plate 2.1 of the first outer electrode unit group 2.1A has a first arc-shaped structure at an end corresponding to the inner electrode group 1. The first arc-shaped structure of each electrode plate 2.1 in the first outer electrode unit group 2.1A includes a first arc-shaped segment 2.1.1 and a second arc-shaped segment 2.1.2. Each electrode plate 2.1 of the second outer electrode unit group 2.1B has a second arc-shaped structure at an end corresponding to the inner electrode group 1. The second arc-shaped structure of each electrode plate 2.1 in the second outer electrode unit group 2.1B includes a first arc-shaped segment 2.1.1 and a third arc-shaped segment 2.1.5. The distance R1 from the third arc-shaped segment 2.1.5 to the central axis is smaller than the distance R0 from the second arc-shaped segment 2.1.2 to the central axis, as shown in FIG. which is used to assist in fine-tuning of the field shape distribution. Meanwhile, in order to improve the assembly aesthetics of the ion trap, the width of each electrode plate 2.1 in the first outer electrode group 2 is the same as that of each electrode plate 2.1 in the second outer electrode group 2. Further, one side of each electrode plate 2.1 of the first outer electrode unit group 2.1A corresponding to the inner electrode group 1 also comprises a first straight line segment 2.1.8 butted with the second arc-shaped segment 2.1.2. One side of each electrode plate 2.1 of the second outer electrode unit group 2.1B corresponding to the inner electrode group 1 further comprises a second straight line segment 2.1.9 butted with the third arc-shaped segment 2.1.5. Because the distance R1 from the third arc-shaped segment 2.1.5 to the central axis is smaller than the distance R0 from the second arc-shaped segment 2.1.2 to the central axis, the length of the second straight line segment 2.1.9 is greater than that of the first straight line segment 2.1.8. The insulating end cover 4 abuts against the first straight line segment 2.1.8 of each electrode plate 2.1 of the first outer electrode unit group 2.1A or the second straight line segment 2.1.9 of each electrode plate 2.1 of the second outer electrode unit group 2.1B through the positioning step 4.1 to achieve the effect of radially positioning the electrode plates 2.1. In the exemplary embodiment, because of the voltage difference between the electrode plates 2.1 of the first outer electrode unit group 2.1A and the electrode plates 2.1 of the second outer electrode unit group 2.1B, through adding a positive or negative high-order field through the quadrupole logarithmic field, the field shape distribution is fine-tuned by adjusting the voltages of the electrode plates 2.1 in the second outer electrode unit group 2.1B and the first outer electrode unit group 2.1A when the electrostatic ion trap is working, so as to correct the errors generated in the manufacturing process of the ion trap.

For example, in actual operations, when analyzing positive ions, when is is found that the axial reflection of the actual ion trap is too soft, the voltages of the electrode plates 2.1 of the second outer electrode unit group 2.1B are adjusted from 0V to a positive value. In this case, the field shape in the space 3 better highlights the positive high-order field, and the issue of which the reflections are too soft is corrected.

On the contrary, when the axial reflection of the actual ion trap is too hard, the voltages of the electrode plates 2.1 of the second outer electrode unit group 2.1B are adjusted from 0V to a negative value. In this case, the field shape in the space 3 better highlights the negative high-order field, and the issue of which the reflections are too hard is corrected.

In addition, this embodiment is also used for overcoming the influence of the charges in the space 3 on the electric field in the ion trap. For example, when the ions with a wide mass range and high density are injected, the charges in the space 3 can cause certain negative high-order field. The field shape correction can be performed by adjusting the voltages of certain electrode plates 2.1 of the second outer electrode unit group 2.1B, so that real-time adjustment and correction are realized, and the analysis dynamic range of the orbitrap is further expanded.

EMBODIMENT 3

Figure 7B:
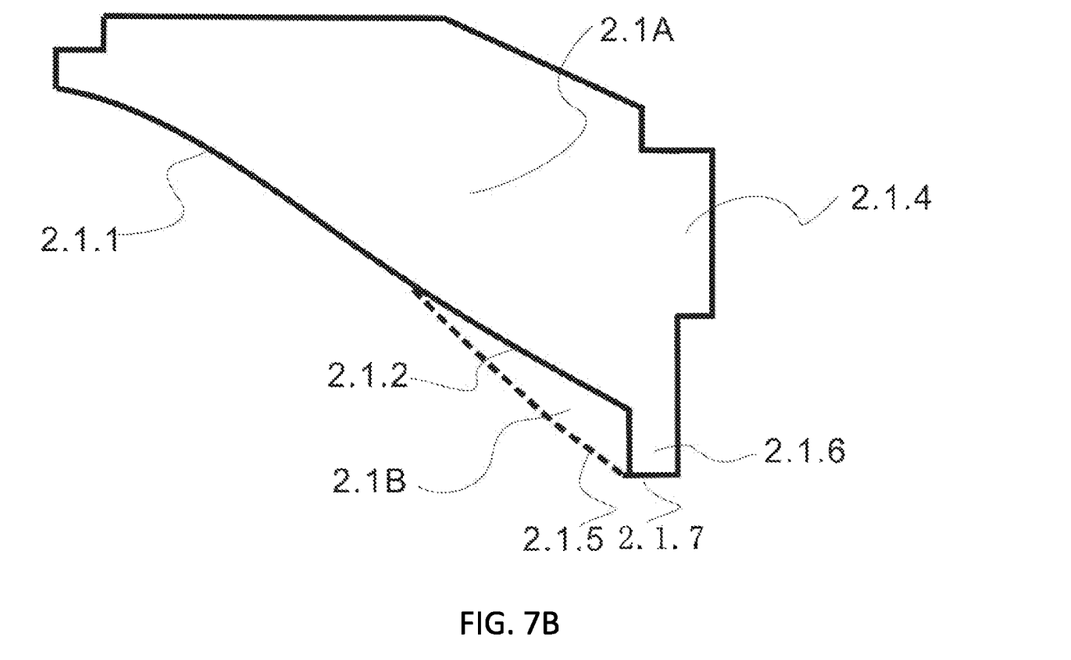
FIG. 7B is a schematic diagram illustrating a comparison between an electrode plate of the first outer electrode unit group and an electrode plate of the second outer electrode unit group in an electrostatic ion trap according to embodiment 3 of the present invention.

The difference between this embodiment and embodiment 2 is shown in FIG. 7B, where electrode plates of the first outer electrode unit group 2.1A and the second outer electrode unit group 2.1B are superimposed and compared. The width of the electrode plate 2.1 in the first outer electrode group 2 is the same as the electrode plate 2.1 in the second outer electrode group 2. Each electrode plate of the first outer electrode unit group 2.1A further includes a first compensation block 2.1.6 at an end corresponding to the inner electrode group 1. The first compensation block 2.1.6 is integrally butted with the second arc-shaped segment 2.1.2. Each electrode plate of the second outer electrode unit group 2.1B further includes a third straight line segment 2.1.7 at an end corresponding to the inner electrode group 1. The third straight line segment 2.1.7 is integrally butted with the third arc-shaped segment 2.1.5. The side length of the first compensation block 2.1.6 is equal to the length of the third straight line segment 2.1.7.

EMBODIMENT 4

Figure 8:
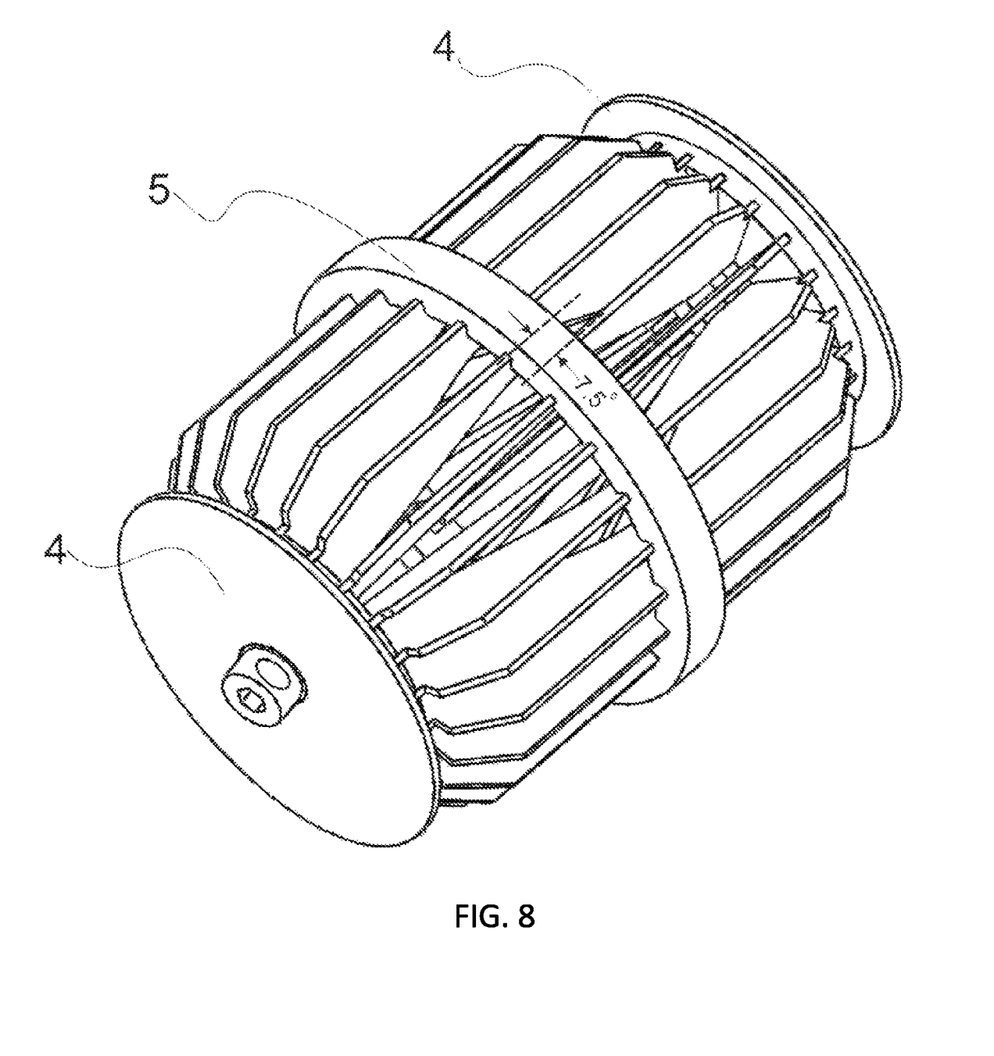
FIG. 8 is a schematic structural diagram of an electrostatic ion trap according to embodiment 4 of the present invention.

As shown in FIG. 8, the present embodiment differs from embodiments 1-3. The electrostatic ion trap in the exemplary embodiment utilizes the two outer electrode groups 2 to detect the image charge signals. This also requires that the capacitance between the two outer electrode groups 2 is relatively small, but to ensure the integrity of the electric field in the ion trap, the interval between each of the outer electrode groups 2 is small. The electrode plates 2.1 of each outer electrode group 2 is evenly arranged circumferentially on the outer periphery of the inner electrode group 1. The electrode plates 2.1 in one outer electrode group 2 and the electrode plates 2.1 in another outer electrode group 2 are circumferentially staggered, and the backward staggered angle in the exemplary embodiment is 7.5 degrees.

EMBODIMENT 5

Figure 9:
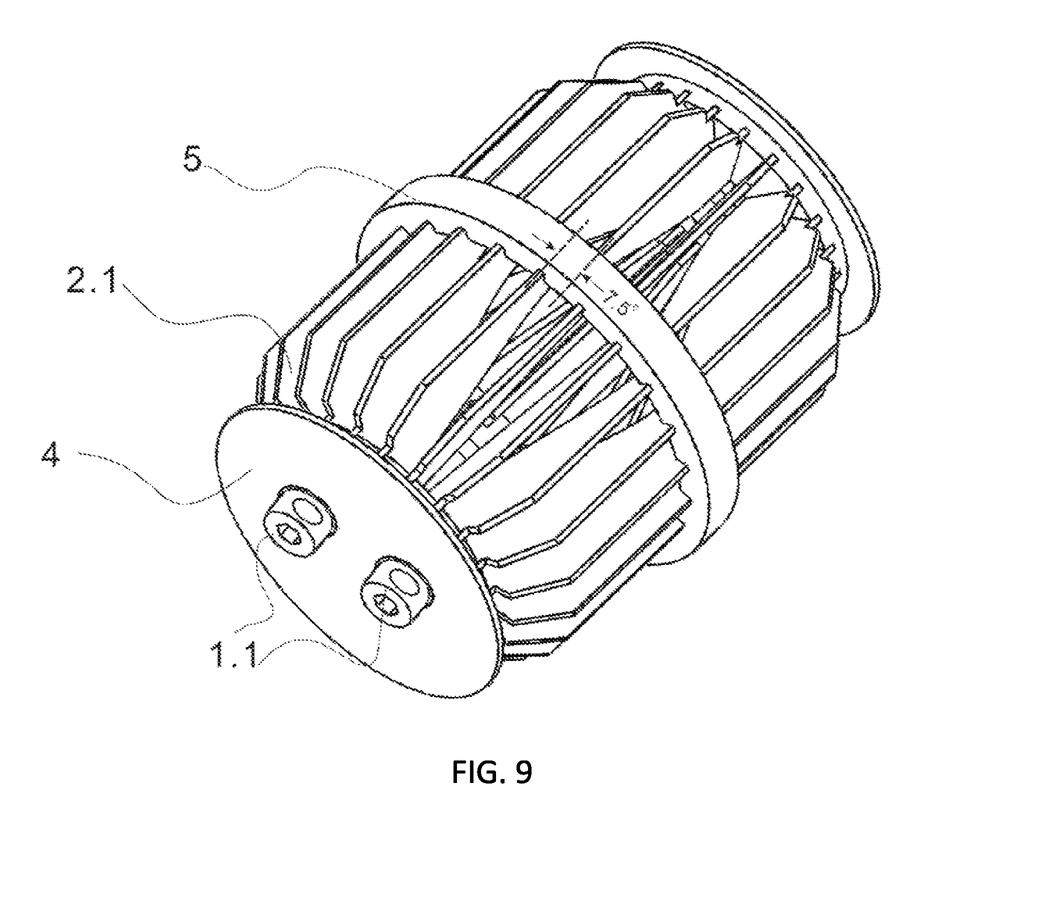
FIG. 9 is a schematic structural diagram of an electrostatic ion trap according to embodiment 5 of the present invention.
Figure 10:
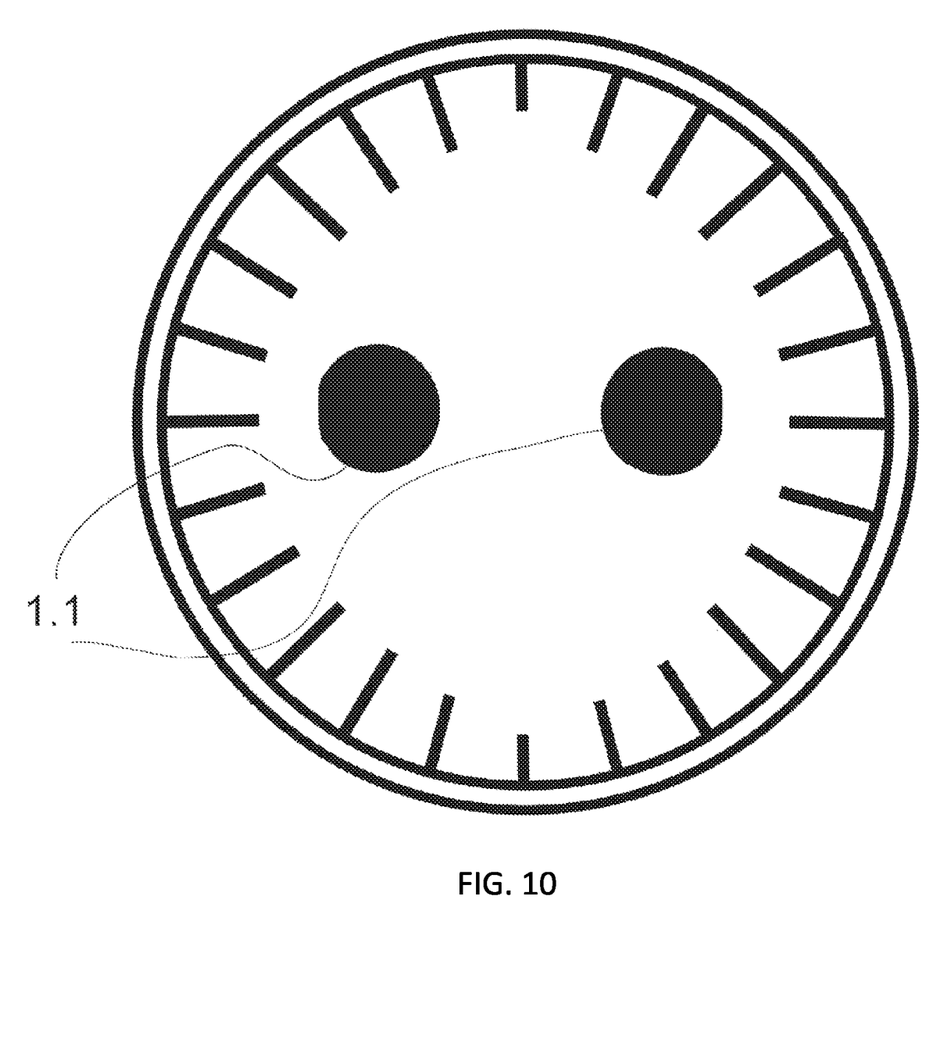
FIG. 10 is a schematic distribution diagram of the center electrode and the electrode plate of an electrostatic ion trap according to embodiment 5 of the present invention.

As shown in FIGS. 9-10, the difference between the present embodiment and embodiments 1-4 is that the inner electrode group 1 includes two central electrodes 1.1. The two central electrodes 1.1 are symmetrically disposed by rotating 180 degrees around a central axis as a symmetry axis. Outer sides of the plurality of electrode plates 2.1 of the outer electrode groups 2 are circumferentially distributed on the periphery of the inner electrode group 1 around the central axis as a circle center, inner sides of the plurality of electrode plates 2.1 of the outer electrode groups 2 define an elliptical waveguide curve, where the elliptical waveguide curve of the present embodiment satisfies: $(x^2+y^2)^2-2c^2(x^2-y^2)=k^4-c^4$; $k \geq \sqrt{2}c$, thereby, forming an electric field structure close to that of the Cassinian ion trap.

When the voltages are applied to the inner electrode group 1 and the outer electrode groups 2, the ions oscillate or rotate between the outer electrode groups 2 and the two central electrodes 1.1, and simultaneously vibrate back and forth in the direction of the central axis, and the electric field distribution can make the period of the axial vibration of the ions to meet the isochronous focusing on the kinetic energy of different ions.

Although the present disclosure has been described above, the scope of the present disclosure is not limited thereto. Those skilled in the art can make various changes and modifications without departing from the spirit and scope of the present disclosure, and such changes and modifications will fall within the scope of the present invention.

What is claimed is:

1. An electrostatic ion trap, comprising:
   a central axis and a central symmetry plane perpendicular to the central axis;
   an inner electrode group (1); and
   a pair of outer electrode groups (2) arranged on two sides of the central symmetry plane along the central axis,
   wherein each outer electrode group (2) comprises a plurality of electrode plates (2.1), the plurality of electrode plates (2.1) are circumferentially distributed around a periphery of the inner electrode group (1) and centered on the central axis, at least two electrode plates (2.1) in the same outer electrode group (2) are electrically connected, and a potential difference is formed when voltages are respectively applied to the inner electrode group (1) and the outer electrode groups (2), thereby forming a space (3) for trapping ions between the inner electrode group (1) and the outer electrode groups (2).

2. The electrostatic ion trap of claim 1, wherein the inner electrode group (1) comprises a central electrode (1.1), the central electrode (1.1) being arranged along with the central axis.

3. The electrostatic ion trap of claim 1, wherein the inner electrode group (1) comprises two central electrodes (1.1), the two central electrodes (1.1) being arranged centrosymmetrically about the central axis.

4. The electrostatic ion trap of claim 1, wherein the pair of outer electrode groups (2) are symmetrically disposed on opposite sides of the central symmetry plane.

5. The electrostatic ion trap of claim 1, wherein the plurality of electrode plates (2.1) of each outer electrode group (2) are evenly arranged on the periphery of the inner electrode group (1), wherein the electrode plates (2.1) of one of the pair of outer electrode groups (2) and the electrode plates (2.1) of another of the pair of the outer electrode groups (2) are staggered circumferentially.

6. The electrostatic ion trap of claim 1, wherein both ends of the inner electrode group (1) are fixedly connected with two insulating end covers (4) respectively through threaded fasteners;
   an insulating central ring sleeve (5) is arranged between the two insulating end covers (4) at a position, corresponding to the central symmetrical plane, of the periphery of the inner electrode group (1);
   the electrode plates (2.1) of the outer electrode groups (2) are clamped between the insulating end covers (4) and the insulating central ring sleeve (5);
   each electrode plate (2.1) has a clamping portion (2.1.3) integrally formed at one end corresponding to the insulating central ring sleeve (5), and a positioning portion (2.1.4) integrally and convexly formed at another end corresponding to the insulating end cover (4);
   each insulating end cover (4) has an inner surface, a positioning step (4.1) integrally formed on an inner surface, and a plurality of radially extending positioning grooves (4.2) circumferentially formed on the inner surface and surrounding the positioning step (4.1);
   each electrode plate (2.1) is abutted against and clamped with the insulating central ring sleeve (5) through the clamping portion (2.1.3); and
   each electrode plate (2.1) is clamped with a respective one of the insulating end covers (4) through the positioning portion (2.1.4) of said electrode plate (2.1) received in the positioning groove (4.2) of said insulating end covers (4) such that an inner side of said electrode plate (2.1) is abutted against the positioning step (4.1) of said insulating end covers (4).

7. The electrostatic ion trap of claim 1, wherein the electrode plates in each outer electrode group are characterized into a first outer electrode unit group (2.1A) and a second outer electrode unit group (2.1B), an adjustment potential difference is formed between the first outer electrode unit group (2.1A) and the second outer electrode unit group (2.1B) when voltages are applied to the first outer electrode unit group (2.1A) and the second outer electrode unit group (2.1B), and the electrode plates of the first outer electrode unit group (2.1A) and the electrode plates of the second outer electrode unit group (2.1B) are distributed alternatively.

8. The electrostatic ion trap of claim 7, wherein
   each electrode plate (2.1) of the first outer electrode unit group (2.1A) has a first arc-shaped structure at a side corresponding to the inner electrode group (1), the first arc-shaped structure of each electrode plate (2.1) of the first outer electrode unit group (2.1A) comprises a first arc-shaped segment (2.1.1) and a second arc-shaped segment (2.1.2);
   each electrode plate (2.1) of the second outer electrode unit group (2.1B) has a second arc-shaped structure at a side corresponding to the inner electrode group (1), the second arc-shaped structure of the electrode plate (2.1) of the second outer electrode unit group (2.1B) comprises a first arc-shaped segment (2.1.1) and a third arc-shaped segment (2.1.5); and
   a distance from the third arc-shaped segment (2.1.5) to the central axis is smaller than that from the second arc-shaped segment (2.1.2) to the central axis.

9. The electrostatic ion trap of claim 1, wherein each electrode plate (2.1) on the incident path of ions into the space (3) in the outer electrode group (2) is provided with an entrance notch (6) to facilitate entry of the ions.

10. The electrostatic ion trap of claim 1, wherein each electrode plate (2.1) is a hard metal plate having a thickness of 0.5 mm to 2 mm, made by an electric spark cutting process.

* * * * *